July 20, 1954

R. ANXIONNAZ ET AL 2,683,964

GAS TURBINE POWER PLANT OF WIDELY VARIABLE OUTPUT

Filed June 14, 1951

INVENTORS
René Anxionnaz
+ R. J. Imbert

By Watson, Cole, Grindle + Watson

INVENTORS
René Anxionnaz
& R. J. Imbert
By Watson, Cole, Grindle & Watson

July 20, 1954  R. ANXIONNAZ ET AL  2,683,964
GAS TURBINE POWER PLANT OF WIDELY VARIABLE OUTPUT
Filed June 14, 1951  3 Sheets-Sheet 3

INVENTORS
René Anxionnaz
& R. J. Imbert
By Watson, Cole, Grindle
& Watson

Patented July 20, 1954

2,683,964

UNITED STATES PATENT OFFICE 2,683,964

GAS TURBINE POWER PLANT OF WIDELY VARIABLE OUTPUT

René Anxionnaz and Roger J. Imbert, Paris, France, assignors of one-half to said Anxionnaz and one-half to Societe Rateau (Societe Anonyme), Paris, France, a company of France Application June 14, 1951, Serial No. 231,506

Claims priority, application France July 3, 1950

11 Claims. (Cl. 60—39.17)

The present invention concerns an improvement in gas turbine installations of highly variable rates of operation which are applicable especially to driving installations, for example for locomotives, and more especially to marine propulsion sets.

It is known that one of the operational requirements of driving installations for the propulsion of warships is that they should have a cruising speed and a very high speed for periods of combat.

The power ratio of these speeds may differ according to the type of craft under consideration, but for convoy escorts in particular the speeds required for these two purposes are, for example, 15 and 30 knots respectively.

The speed variation required calls for assemblies of driving unit capable of economically providing the power corresponding to the cruising speed, and a power about 10 times greater at combat speed, the latter being obtained only in exceptional cases without any necessity to provide an equally high output therefor.

Balancing arrangements have been provided for adapting, to the variations of the rate of operation a set of gas turbines such as those disclosed in the U. S. Patent No. 2,245,954.

Gas turbine installations are also known for adapting an assembly to obtain good outputs at low loads.

The present invention concerns arrangements for gas turbine assemblies by means of which it is possible to obtain under the best possible conditions the two power rates hereinbefore referred to for warships or other craft, and which comprises a propulsion group which ensures cruising operation and a booster group mechanically independent of the propulsion group and boosting the latter.

The description which follows with reference to the accompanying drawings, which are given by way of nonlimitative example, will enable the manner in which the invention can be carried into effect to be readily understood the details appearing both from the text and from the drawing naturally forming part of the said invention.

Figure 1:
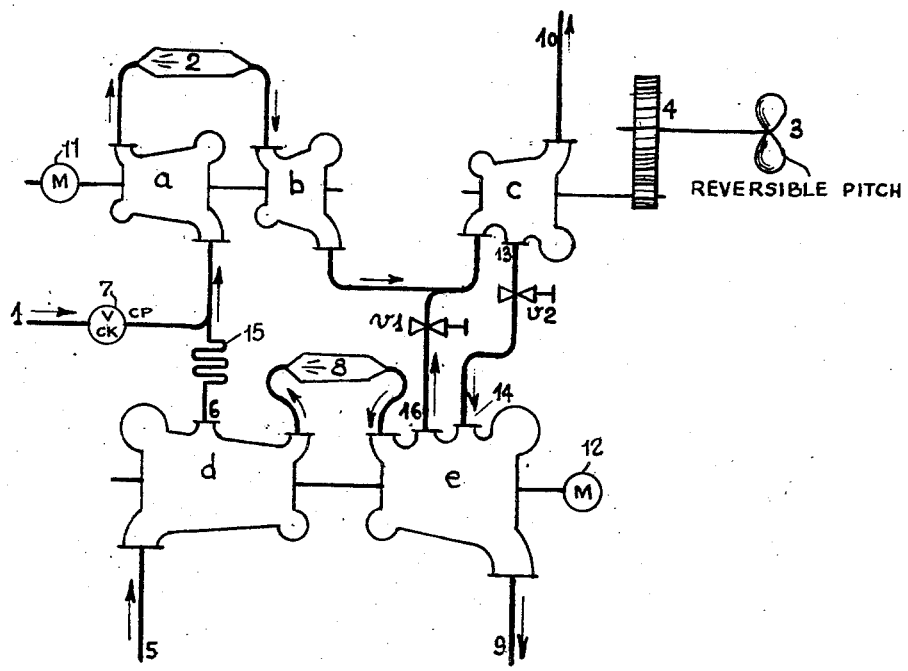
Fig. 1 shows diagrammatically an arrangement of simple form.
Figure 4:
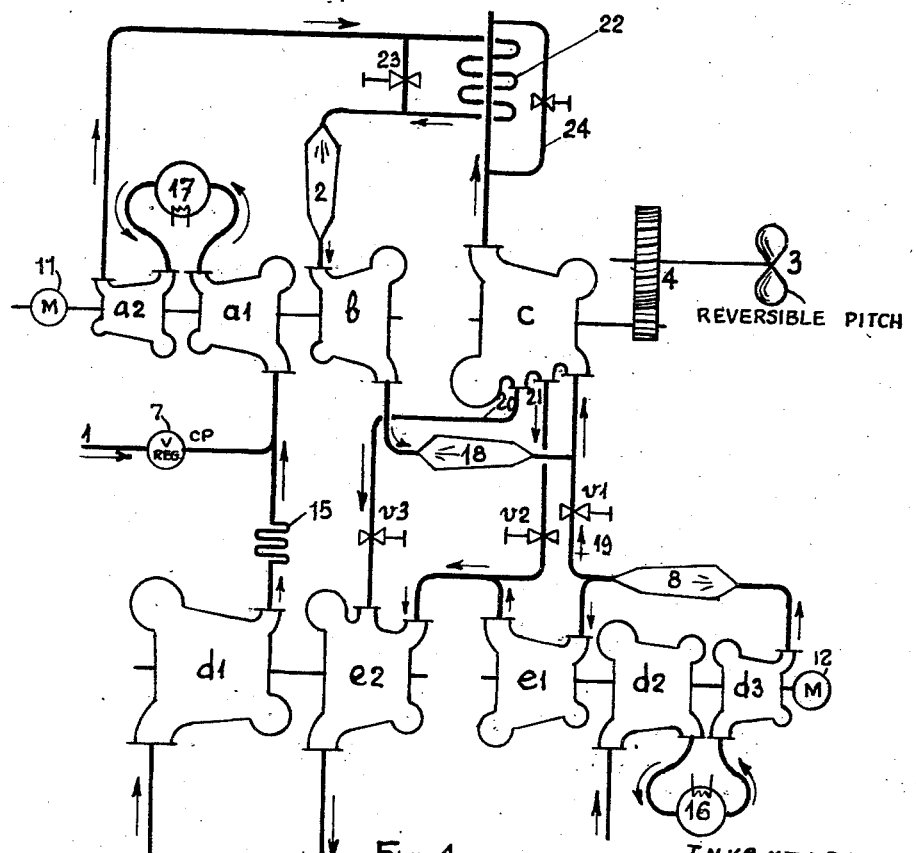
Fig. 4 shows by way of indication the diagram of a more complete arrangement of a driving installation according to the invention.
Figure 6:
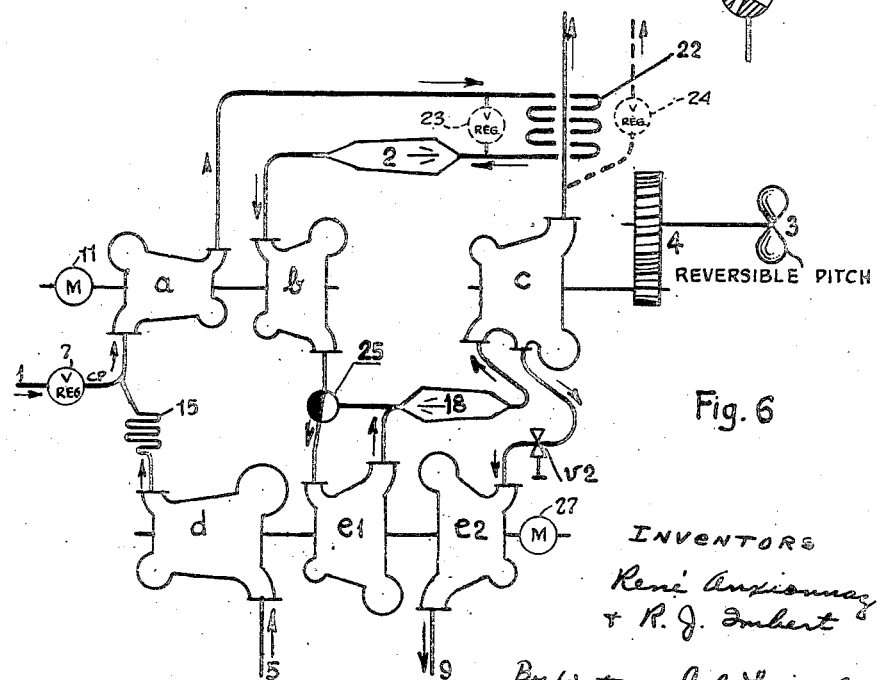
Fig. 6 shows another solution necessitating no supplementary ignition for reaching the peak rate of operation.

It will be noted that the installation diagrammatically illustrated in Fig. 1, as also in Figs. 4 and 6, comprises two turbo-compressor groups, namely an upper group, which operates alone at the cruising rate, and a lower group which ensures boosting of the first during peak operation.

In Fig. 1, the upper group comprises a compressor $a$ mechanically connected to the turbine $b$. The air taken in at 1 by the compressor $a$ is delivered into the combustion chamber 2. The gas mixture leaving this chamber feeds the turbines $b$ and $c$ arranged in series without any mechanical connection. The exhaust from the turbine $c$ takes place at 10. The turbine $c$ drives the driven element, for example the screw 3, through a reduction unit 4, for example a reduction gear. In addition, the suction duct 1 comprises the nonreturn valve 7. A starting device 11 is provided for the group $a$, $b$.

The second group or boosting group, comprises the compressor $d$ taking the air at 5 and delivering it into the combustion chamber 8. The gas mixture leaving this chamber feeds the turbine $e$, which drives the compressor $d$. The exhaust from the turbine $e$ takes place at 9. A starting device 12 may be provided to drive the turbine $e$.

A branch line extending through a cooling unit 15 connects an intermediate stage 6 of the compressor $d$ to the intake duct of the compressor $a$. In addition, a branch duct comprising the gate valve $v_1$ connects an intermediate stage 16 of the turbine $e$ to the feed duct of the turbine $c$. Furthermore, a second branch line comprising the gate valve $v_2$ connects an intermediate stage 13 of the turbine $c$ to a lower stage 14 of the turbine $e$.

For the sake of greater clarity of the diagram, the screw is assumed to have a reversible pitch, and no turbine for travel astern is provided. Naturally, the latter could be incorporated without the assembly thus provided departing from the scope of the invention.

The group $a$, $b$, $c$ alone provides the propulsion during normal running.

When passing to peak running, the second turbo-compressor group is placed in operation. The compressor $d$ delivers part of the air taken into the intermediate compression stage at 6, which takes the place of the normal intake 1 of the compressor $a$, which is at this moment closed by the non-return valve 7. The compressor $a$ is thus boosted.

The group $a$, $b$, $c$ thus being boosted by the group $d$, $e$, it would be necessary to set up at the outlet from the turbine $c$ a counter-pressure corresponding to the boosting rate in order that the group $a$, $b$, $c$ may operate with delivery volumes, compression ratios and expansion ratios equivalent to those of unboosted running, the speeds and temperatures remaining theoretically the same, especially if a cooling unit 15 is provided between $d$ and $a$.

Owing to the fact that this counter-pressure is not set up, it is necessary to introduce upstream of the turbine $c$ a supplementary feed to compensate for the increase of the expansion in this turbine and to maintain at the outlet from the turbine $b$ the pressure corresponding to its rate of expansion, that is to say, the pressure by which it is possible to maintain the ratios of compression and expansion of the group $a$, $b$ equivalent to those of unboosted operation.

This supply is taken from the turbine $e$ at 16.

Speed of rotation of the group $a$, $b$ is thus substantially maintained, while the supplementary expansion, and consequently the speeds of flow at $c$, are then adapted to the increase in the speed of rotation of the screw.

However, it is to be noted that the delivery volumes at the exhaust from the turbine $c$ might become too great for the boosting rate by which the ratio of 1:10 between the powers is ensured, and might be detrimental to the output of this engine. The increase of the supply at the head of this turbine is therefore combined with a by-pass 13 from an intermediate stage, which is led to an intermediate stage of the turbine $c$ at 14. The greater part of the pressure drop in the boosting operation therefore takes place in the upper stages of the turbine $c$ and the accumulation of gases which might slow down this turbine at the lower stages is therefore avoided, the residual pressure of these gases being usefully employed in the turbines $c$ and $e$.

The regulation of the aforesaid supply and by-pass is effected with the aid of the gate-valves or shut-off members $v_1$ and $v_2$.

The starting points of the by-passes at the turbines $c$ and $e$ are such that the loss of energy resulting from these regulations, principally by reason of the considerable differences in the rates of running to be met by the turbine $c$, the output of which is optimum only for a single well-defined rate of operation, is reduced to a minimum during the boosting operation.

It will also be noted that the compressor $d$ must supply a pressure higher than the exhaust pressure at the turbine $b$ during peak running.

Naturally, these by-passes of air at 6 and of gas at 16 and the supply of gas at 14 must be taken into consideration in the construction of the assembly $d$, $e$.

Figure 2:
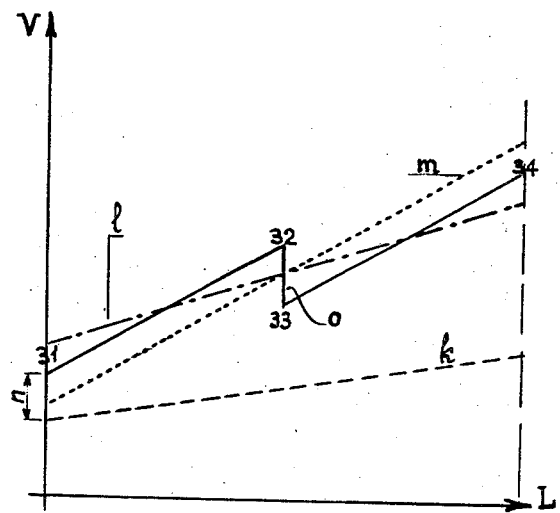
Figs. 2 and 3 are graphs explaining the details of the invention.

Fig. 2 shows the theoretical advantage of the new arrangement. In this figure, the length L of the stream of the turbine $c$ has been plotted along the abscissae, and the delivery volumes V along the ordinates.

The curve $k$ represents the output volume of the turbine $c$ during normal operation, and the curve $l$ the delivery volume desirable during peak operation.

If the speed of rotation is changed from single to double in order to maintain the output and to ensure adaptation of the velocity triangles in each expansion stage of the turbine $c$, the values of the curve $l$ must be substantially double those of the curve $k$ at any point of the stream.

With the condition which must be fulfilled at the outlet from the turbine $b$, and with no provision as to supplementary supply and by-passing during boosted operation the delivery volumes in the turbine $c$ would be substantially those of the curve $m$.

Due to the supply $n$ at the head of this turbine, and the by-pass $o$ at an intermediate stage, the curve of the delivery volumes passes through the points 31, 32, 33 and 34 approaching the ideal curve $l$.

Figure 3:
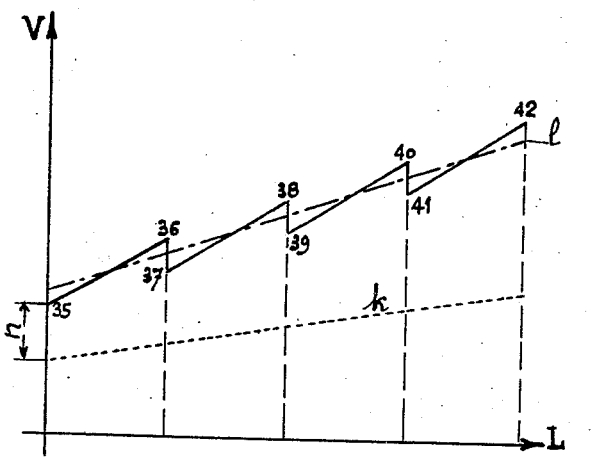

Naturally, several intermediate by-passes may be effected, in which case the curve of Figure 3 is obtained.

The supplementary supply is greater in this case, but the curve 35, 36, 37, 38, 39, 40, 41 and 42 approaches much more closely to the ideal curve.

The invention may also be applied when the compressors and turbines comprise a plurality of elements, with intermediate cooling and heating units, and Fig. 4 gives an example of such an arrangement.

The compressor $a$ consists of two elements $a_1$ and $a_2$ with an intermediate cooling unit 17. As in Figure 1, a cooling unit 15 is provided between the compressors $d_1$ and $a_1$. The turbine $e$ also comprises two elements $e_1$ and $e_2$, the element $e_2$ driving the compressor $d_1$ and the element $e_1$ driving the compressors $d_2$ and $d_3$.

In the propulsion group, a heating unit 18 is provided upstream of the turbine $c$ in addition to the combustion chamber 2. During peak operation, a supplementary supply 19 adjustable with the aid of the gate valve $v_1$ is added. There are two intermediate by-passes designated by 21 and 29, and adjusted by the shut-off devices $v_2$ and $v_3$. The first is provided on the upstream side of the turbine $e_2$ and the second is connected to an intermediate stage of this same turbine.

In this arrangement, a unit 22 for the recovery of the exhaust heat of the turbine $c$ is also provided. This recovery unit, which is especially useful during cruising operation, may be by-passed at peak operation in order to prevent any increase in pressure losses, by means of the by-passes 23 and 24 situated in the air and gas circuits respectively. As in the example shown in Fig. 1, starters 11 and 12 and a non-return valve 7 in the air intake of the compressor $a$, are provided.

It is also possible to employ for running astern a reversible-pitch screw 3 driven through a reduction gear 4, in place of a turbine for running astern, these arrangements not affecting the invention.

It will be noted that if the pressure provided by the compressor $d_3$ is higher than the outlet pressure at the turbine $b$, the supplementary supply at the head of the turbine $c$ may consist of a by-pass from an intermediate stage of the turbine $e_1$ or $e_2$.

Figure 5:
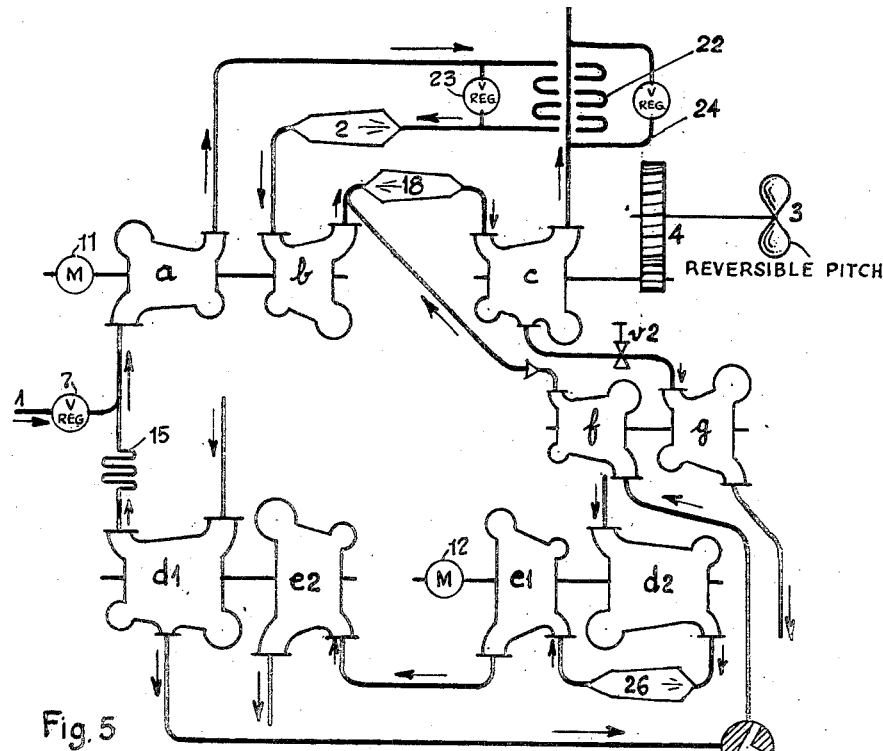
Fig. 5 is a diagram showing a modification of the installation of Fig. 4.

As a modification of Figure 4, Figure 5 shows an assembly in which the supplementary supply and the withdrawal or by-pass, upstream of the turbine $c$ and during the course of the expansion therein respectively, affect a small group independent of the boosting assemblies $d_1$, $e_2$ and $d_2$, $e_1$.

This supplementary group is composed of a turbine $g$ receiving only the by-pass from the turbine $c$, and a compressor $f$ driven by this turbine, which compressor may in some cases supply the whole of the make-up quantity (delivery pressure) to the turbine $c$ in sucking up from the atmosphere or, in other cases, may be employed to bring to the required pressure a by-pass effected from a suitable stage of the compressor $d_1$.

In this figure, there is shown, again by way of example, in addition to the basic diagram of Figure 1, a reheating unit 18 situated between the turbines $b$ and $c$, a recovery unit 22 with by-passes 23 and 24 on the air and gas circuits as in Figure 4, and a boosting assembly which is similar to that of the last-mentioned figure, except that the total compression of the driving fluid of this group is effected entirely in a single element $d_2$.

The greater mechanical complexity of this arrangement (supplementary turbo - compressor group $f, g$) is compensated for by a better separation of the functions, this separation facilitating the starting and the reduced running rates. Naturally, no mechanical connection is provided between the group $a, b, c$ and the boosting groups $f, g, d_1, d_2$ and $e_1, d_2$.

It has previously been seen that in order to adapt the turbine driving the screw to normal running and to peak running by regulating the delivery volumes, that is to say, the speeds of flow in the nozzles in accordance with the speed of rotation of the turbine $c$, it is necessary in some cases to increase the delivery volume leaving the turbine $b$ of the compressor $a$ and entering the main turbine $c$ when the load on the screw increases. This is achieved, in accordance with the foregoing, by a supplementary supply of fluid upstream of this turbine, but this relative increase in the delivery volume may also be obtained by creating a pressure drop between the said turbines, the energy developed in this pressure drop being utilised to drive the boosting compressor.

Figure 6 shows by way of example an assembly according to the modified form of adaptation referred to above. $a$ is the main compressor, $b$ the turbine by which it is driven, $c$ the turbine controlling the screw, $d$ the boosting compressor and $e_1, e_2$ the turbines driving the latter compressor.

The installation is completed by the combustion chambers 2 and 18, the recovery unit 22, a cooling unit 15 downstream of the compressor $d$ and a starting member 11.

A supplementary starting motor 27 may also be provided to compensate for the inadequacy of the turbines $e_1$ and $e_2$ at certain rates of operation. This installation also comprises a non-return valve 7 in the intake 1 of the compressor $a$, a selecting member 25 for passing the circulating gas either into the turbine $e_1$ or directly into the combustion chamber 18 and a shut-off member $v_2$ for effecting the necessary withdrawal in the course of expansion and for feeding the turbine $e_2$.

Finally, the air circuit passing through the recuperator unit 22 may be by-passed by opening the butterfly valve 23, the exhaust gases then being evacuated directly to the atmosphere by opening the butterfly valve 24.

As in the preceding cases, the screw 3 is assumed to have a reversible pitch and the speed reduction unit 4 comprises no special member for running astern. No turbine for running astern is provided, but such a member may be provided without departing from the scope of the invention which, it is repeated, resides in the adaptation of the delivery volume passing through the main turbine at speeds of rotation changing practically from single to double between normal operation and peak operation.

It is also to be noted that the turbine $e_1$ could be fed beyond the combustion chamber 18 and that the turbine $e_2$ could be fed by a number of successive by-passes or withdrawals from the turbine $c$.

With the assembly described in the foregoing, normal operation is obtained by feeding the turbine $c$, the compressor $a$ being driven by the turbine $b$. The two combustion chambers 2 and 18 are ignited, the selecting member 25 causes the circulating gases to pass directly into the combustion chamber 18, and the shut-off member $v_2$ and the butterfly valves 23—24 are closed.

During boosted operation, the selecting member 25 causes the gases to pass partially or entirely into the turbine $e_1$, and the shut-off device $v_2$ is partly or completely open.

In order that the fullest advantage may be gained from any power which is supplied without any considerations of economy, the recuperator 22 is by-passed by opening of the butterfly valves 23—24.

Finally, the non-return valve 7 is maintained closed by the pressure of the compressor $d$.

It will be seen from the foregoing that the passage from one rate of operation to the other is obtained simply by increasing the amount of fuel supplied to the combustion chambers and by operating the isolating or shut-off members situated in the different circuits. The combustion chambers both remain ignited in the two cases, and all the intermediate rates of operation are obtained by regulating the fuel feed to the two chambers and regulating the members 25 and $v_2$.

Naturally, the turbines $e_1$ and $e_2$ may, without departing from the scope of the invention, have different relative importance, and in some particular cases one or other may be eliminated.

One of the essential features of the invention therefore resides in the mechanical independence of the driving turbine $c$ and of the turbo-compressor by which it is fed in normal operation and which is designated by $a, b$ as also the mechanical independence of the aforesaid turbo-compressor group and of the various boosting means described.

The method by which the gate valves, butterfly valves or shut-off or selecting devices of the different supplementary supply or by-pass circuits are controlled is not shown in the figures. This may be done by various known means, by manual controls or controls connected with a regulating assembly.

What we claim is:

1. In a gas turbine power plant adapted to deliver increased power during intermittent boosted operation, the combination of a main turbine compressor group including a main gas turbine, a main air compressor drivenly connected to said main turbine and adapted to supply said main turbine with motive fluid, and a power turbine mechanically separated from said main compressor and from said main turbine for delivering useful power, pipe means connecting the exhaust of said main turbine to the inlet of said power turbine for supplying the latter with motive fluid, an auxiliary turbine-compressor group mechanically separated from said main turbine-compressor group for supercharging said main turbine-compressor group during boosted operation, said auxiliary turbine-compressor group including auxiliary compressor means and auxiliary turbine means drivingly connected to said auxiliary compressor means and adapted to be supplied at least partly with motive fluid originating from said auxiliary compressor means, an air line tapped from said auxiliary compressor means to the inlet of said main compressor for supplying the latter with air under pressure during boosted operation, a motive fluid line branched at a part under pressure of said auxiliary turbine-compressor group, other than said air line tapping, said motive fluid line being connected to said pipe means for delivering motive fluid to the inlet of said power turbine during boosted operation, and heating means for the air under pressure originating from said main compressor and from said auxiliary compressor means.

2. In a gas turbine power plant adapted to deliver increased power during boosted operation, the combination of a main turbine compressor group including a main gas turbine, a main air compressor drivenly connected to said main turbine and adapted to supply said main turbine with motive fluid, and a multi-stage power turbine mechanically separated from said main compressor and from said main turbine for delivering useful power, pipe means connecting the exhaust of said main turbine to the inlet of said power turbine for supplying the latter with motive fluid, air intake duct means connected to the inlet of said main compressor and arranged to receive fluid from an external source, an auxiliary turbine-compressor group mechanically separated from said main turbine-compressor group for supercharging said main turbine-compressor group during boosted operation, said auxiliary turbine-compressor group including auxiliary compressor means and multi-stage auxiliary turbine means drivingly connected to said auxiliary compressor means and adapted to be supplied at least partly with motive fluid originating from said auxiliary compressor means, an air line tapped from said auxiliary compressor means to the inlet of said main compressor for supplying the latter with air under pressure, a gas line from an intermediate expansion stage of said multi-stage power turbine to an expansion stage of said auxiliary turbine means for supplying the latter with motive fluid and for discharging excess amount of low pressure motive fluid from said power turbine during boosted operation, a motive fluid line branched at a part under pressure of said auxiliary turbine-compressor group, other than said air line tapping, said motive fluid line being connected to said pipe means for delivering motive fluid to the inlet of said power turbine, during boosted operation, heating means for the air under pressure originating from said main compressor and from said auxiliary compressor means, a check valve in said air intake duct means for preventing air under pressure delivered by said auxiliary compressor means to the inlet of said main compressor to pass into said air intake duct means, and a valve in said gas line for disconnecting said gas line during non-boosted operation.

3. In a gas turbine power plant adapted to deliver increased power during boosted operation, the combination of a main turbine compressor group including a main gas turbine, a main air compressor drivenly connected to said main turbine and adapted to supply said main turbine with motive fluid, and a multi-stage power turbine mechanically separated from said main compressor and from said main turbine for delivering useful power, pipe means connecting the exhaust of said main turbine to the inlet of said power turbine for supplying the latter with motive fluid, an auxiliary turbine compressor group mechanically separated from said main turbine-compressor group for supercharging said main turbine-compressor group during boosted operation, said auxiliary turbine-compressor group including an auxiliary multi-stage air compressor and an auxiliary multi-stage gas turbine having a higher intermediate stage and a lower intermediate stage and being mechanically coupled with said auxiliary compressor for driving the latter, an air line from an intermediate stage of said auxiliary multi-stage compressor to the inlet of said main compressor for supplying the latter with air under pressure during boosted operation, a conduit from the outlet of said auxiliary compressor to the inlet of said auxiliary turbine for supplying the latter with motive fluid, a motive fluid line from said higher intermediate stage of said auxiliary gas turbine to said pipe means for delivering motive fluid to the inlet of said power turbine during boosted operation, a gas line from an intermediate stage of said multi-stage power turbine to said lower intermediate stage of said auxiliary turbine for supplying the low pressure part of said auxiliary turbine with motive fluid and for discharging excess amount of low pressure motive fluid from said power turbine during boosted operation, heating means between said main air compressor and said main turbine for heating the air delivered to said main turbine, and further heating means in said conduit for heating the motive fluid delivered to the inlet of said auxiliary turbine.

4. In a gas turbine power plant adapted to deliver increased power during intermittent boosted operation, the combination of a main turbine-compressor group including a main gas turbine, a main air compressor mechanically coupled with said main turbine to be driven thereby and adapted to supply said main turbine with air under pressure, and a multi-stage power turbine mechanically separated from said main compressor and from said main turbine for delivering useful power, said power turbine having a higher intermediate stage and a lower intermediate stage, pipe means connecting the exhaust of said main turbine to the inlet of said power turbine for supplying said power turbine with motive fluid, an auxiliary turbine-compressor group mechanically separated from said main turbine-compressor group for supercharging said main turbine-compressor group during boosted operation, said auxiliary turbine-compressor group including an auxiliary multi-stage gas turbine, an auxiliary air compressor mechanically coupled with said auxiliary turbine to be driven thereby, a further auxiliary gas turbine and at least one further auxiliary air compressor mechanically coupled with said further auxiliary turbine to be driven thereby, an air line from the outlet of said former mentioned auxiliary compressor to the inlet of said main compressor for supplying the latter with air under pressure during boosted operation, a motive fluid line connecting the outlet of said further auxiliary compressor to said pipe means on the one hand and to the inlet of said further auxiliary turbine on the other hand for supplying said further auxiliary turbine with motive fluid and for delivering motive fluid to the inlet of said power turbine during boosted operation, a conduit from the outlet of said further auxiliary turbine to the inlet of said former mentioned auxiliary turbine for supplying the latter with motive fluid, a gas line from said higher intermediate stage of said power turbine to the inlet of said former mentioned auxiliary turbine for supplying the latter with motive fluid and for discharging excess amount of low pressure motive fluid from said power turbine during boosted operation, a further gas line from said lower intermediate stage of said power turbine to an intermediate stage of said former mentioned auxiliary multi-stage turbine for supplying the latter with motive fluid and for discharging excess amount of still lower pressure motive fluid from said power turbine, heating means for the air delivered to said main turbine, and further heating means for the air supplied by said further auxiliary compressor.

5. In a gas turbine power plant adapted to deliver increased power during boosted operation, the combination of a main turbine compressor group including a main gas turbine, a main air compressor drivenly connected to said main turbine and adapted to supply said main turbine with motive fluid, and a multi-stage power turbine mechanically separated from said main compressor and from said main turbine for delivering useful power, pipe means connecting the exhaust of said main turbine to the inlet of said power turbine for supplying the latter with motive fluid, an auxiliary turbine-compressor group mechanically separated from said turbine-compressor group for supercharging said main turbine-compressor group during boosted operation, said auxiliary turbine compressor group including an auxiliary compressor and auxiliary turbine means having a high pressure part with an intake and with an exhaust and a low pressure part with an intake and with an exhaust, said auxiliary compressor being mechanically coupled with said auxiliary turbine means to be driven thereby, an air line from the outlet of said auxiliary compressor to the inlet of said main compressor for supplying said main compressor with air under pressure during boosted operation, a duct branched at a point of said pipe means and connected to said intake of the high pressure part of said auxiliary turbine means for supplying said high pressure part with motive fluid and for increasing the volume of the exhaust motive fluid of said main turbine during boosted operation, means at the branching point of said duct to said pipe means for selectively connecting the outlet of said main turbine with the inlet of said power turbine and with the intake of the high pressure part of said auxiliary turbine means, a motive fluid line from said exhaust of the high pressure part of said auxiliary turbine means to a point of said pipe means downstream of the branching point of said duct to said pipe means for supplying said power turbine with motive fluid during boosted operation, a gas line from an intermediate stage of said multi-stage power turbine to said intake of the low pressure part of said auxiliary turbine means for discharging excess amount of low pressure motive fluid from said power turbine and for supplying the low pressure part of said auxiliary turbine means with motive fluid during boosted operation, and heating means for the air delivered to the inlet of said main turbine.

6. A gas turbine power plant according to claim 4 in which further heating means are provided in said pipe means for heating the motive fluid supplied from the outlet of said main turbine to the inlet of said power turbine.

7. A gas turbine power plant according to claim 5 in which further heating means are provided in said pipe means for heating the motive fluid delivered to the inlet of said power turbine.

8. In a gas turbine power plant adapted to deliver increased power during boosted operation, the combination of a main turbine compressor group including a main gas turbine, a main air compressor drivenly connected to said main turbine and adapted to supply said main turbine with motive fluid, and a multi-stage power turbine mechanically separated from said main compressor and from said main turbine for delivering useful power, pipe means connecting the exhaust of said main turbine to the inlet of said power turbine for supplying the latter with motive fluid, an auxiliary turbine-compressor group mechanically separated from said main turbine-compressor group for supercharging said main turbine-compressor group during boosted operation, said auxiliary turbine-compressor group including a first auxiliary gas turbine, a first auxiliary air compressor mechanically coupled with said first auxiliary turbine to be driven thereby, a second auxiliary gas turbine, a second auxiliary air compressor mechanically coupled with said second auxiliary turbine to be driven thereby, a third auxiliary gas turbine and a third auxiliary air compressor mechanically coupled with said third auxiliary turbine to be driven thereby, an air line from the outlet of said first auxiliary compressor to the inlet of said main compressor for supplying the latter with air under pressure during boosted operation, a duct from the outlet of said second auxiliary compressor to the inlet of said second auxiliary turbine for supplying the latter with motive fluid, heating means in said duct for the motive fluid fed to said second auxiliary turbine, a conduit from the outlet of said second auxiliary turbine to the inlet of said first auxiliary turbine for supplying the latter with motive fluid, a motor fluid line from the outlet of said third auxiliary compressor to said pipe means for delivering motive fluid to the inlet of said power turbine during boosted operation, a gas line from an intermediate stage of said multi-stage power turbine to the inlet of said third auxiliary turbine for discharging excess amount of low pressure motive fluid from said power turbine and for supplying said third auxiliary turbine with motive fluid, further heating means for the air under pressure supplied to said main turbine, and still further heating means for the motive fluid supplied by said main turbine and by said third auxiliary compressor to said power turbine.

9. A gas turbine power plant according to claim 8 in which said first auxiliary compressor is of the multi-stage type and in which a further air line is branched at an intermediate stage of said first auxiliary compressor and is connected to the inlet of said third auxiliary air compressor for supplying the latter with air under pressure.

10. In a gas turbine power plant according to claim 1, the provision of a heat recuperator for recuperating the heat of the exhaust gas of said power turbine, said recuperator including a gas circuit connected to the exhaust of said power turbine and an air circuit connected to the discharge of said main turbine, said circuits being in heat-exchange relationship, means for bypassing said air and gas circuits being provided for decreasing the air and gas friction loss during boosted operation.

11. In a gas turbine power plant according to claim 1, the provision of cooling means for the air delivered by said auxiliary compressor means to said main air compressor.

References Cited in the file of this patent

UNITED STATES PATENTS

| Number | Name | Date |
|---|---|---|
| 2,245,954 | Anxionnaz | June 17, 1941 |

FOREIGN PATENTS

| Number | Country | Date |
|---|---|---|
| 504,114 | Great Britain | June 29, 1948 |
| 605,081 | Great Britain | July 15, 1948 |
| 253,088 | Switzerland | Dec. 1, 1948 |